US011183720B2

(12) United States Patent
Siering et al.

(10) Patent No.: US 11,183,720 B2
(45) Date of Patent: Nov. 23, 2021

(54) COOLING DEVICE FOR A BATTERY ASSEMBLY, AND UNIT INCLUDING A BATTERY ASSEMBLY AND A COOLING DEVICE

(71) Applicant: Bayerische Motoren Werke Aktiengesellschaft, Munich (DE)

(72) Inventors: Sebastian Siering, Munich (DE); Michael Huber, Munich (DE); Nicolas Flahaut, Munich (DE); Andreas Ring, Olching (DE); Jan Feddersen, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 354 days.

(21) Appl. No.: 16/274,738

(22) Filed: Feb. 13, 2019

(65) Prior Publication Data

US 2019/0181518 A1   Jun. 13, 2019

Related U.S. Application Data

(63) Continuation of application No. PCT/EP2017/069490, filed on Aug. 2, 2017.

(30) Foreign Application Priority Data

Aug. 23, 2016  (DE) .................. 10 2016 215 851.1

(51) Int. Cl.
*H01M 10/6569* (2014.01)
*H01M 10/613* (2014.01)
(Continued)

(52) U.S. Cl.
CPC ..... *H01M 10/6569* (2015.04); *H01M 10/613* (2015.04); *H01M 10/617* (2015.04);
(Continued)

(58) Field of Classification Search
CPC .............................................. H01M 10/6556
See application file for complete search history.

(56) References Cited

U.S. PATENT DOCUMENTS

2011/0262794 A1* 10/2011 Yoon ................... H01M 10/486
429/120
2015/0082821 A1   3/2015 Ganz et al.
(Continued)

FOREIGN PATENT DOCUMENTS

CN      203071196 U     7/2013
CN      104466296 A     3/2015
(Continued)

OTHER PUBLICATIONS

International Search Report (PCT/ISA/237) issued in PCT Application No. PCT/EP2017/069490 dated Oct. 4, 2017 with English translation (seven pages).

(Continued)

*Primary Examiner* — Brian R Ohara
(74) *Attorney, Agent, or Firm* — Crowell & Moring LLP

(57) ABSTRACT

A cooling device for a battery assembly, in particular a high-voltage storage unit, of an electrically driven vehicle has multiple cooling lines in which a coolant is conducted. The cooling device is designed to transfer heat from the battery assembly to the coolant. The cooling device has at least two individual cooling elements which are designed separately, which lie opposite a battery, and each of which is supplied with coolant via a dedicated valve paired with the respective individual cooling element. A unit including a battery assembly and such a cooling device are also provided.

20 Claims, 2 Drawing Sheets

(51) Int. Cl.
*H01M 10/617* (2014.01)
*H01M 10/625* (2014.01)
*H01M 10/6556* (2014.01)
*H01M 10/6567* (2014.01)

(52) U.S. Cl.
CPC ..... *H01M 10/625* (2015.04); *H01M 10/6556* (2015.04); *H01M 10/6567* (2015.04)

(56) References Cited

U.S. PATENT DOCUMENTS

| | | | |
|---|---|---|---|
| 2015/0171493 | A1 | 6/2015 | Freese et al. |
| 2015/0311572 | A1 | 10/2015 | Sung et al. |
| 2016/0285145 | A1* | 9/2016 | Flahaut ............. H01M 10/6556 |
| 2017/0305293 | A1* | 10/2017 | Takizawa .......... H01M 10/6568 |
| 2018/0034119 | A1 | 2/2018 | Siering et al. |

FOREIGN PATENT DOCUMENTS

| | | | | |
|---|---|---|---|---|
| CN | 205211815 U | | 5/2016 | |
| CN | 205429111 U | | 8/2016 | |
| DE | 10 2010 025 525 A1 | | 1/2011 | |
| DE | 102010025525 A1 | * | 1/2011 | ............ H01M 10/63 |
| DE | 10 2009 035 480 A1 | | 2/2011 | |
| DE | 10 2012 209 306 A1 | | 12/2013 | |
| DE | 10 2013 216 513 A1 | | 2/2015 | |
| DE | 10 2015 215 253 A1 | | 2/2017 | |
| EP | 2 637 248 A1 | | 9/2013 | |
| EP | 2637248 A1 | * | 9/2013 | .......... H01M 10/615 |
| WO | WO-2015086249 A1 | * | 6/2015 | .......... H01M 10/617 |

OTHER PUBLICATIONS

German-language Written Opinion (PCT/ISA/237) issued in PCT Application No. PCT/EP2017/069490 dated Oct. 4, 2017 (six pages).

German-language Search Report issued in counterpart German Application No. 10 2016 215 851.1 dated May 31, 2017 with partial English translation (11 pages).

Chinese-language Office Action issued in Chinese Application No. 201780028179.3 dated Dec. 3, 2020 with English translation (15 pages).

\* cited by examiner

COOLING DEVICE FOR A BATTERY ASSEMBLY, AND UNIT INCLUDING A BATTERY ASSEMBLY AND A COOLING DEVICE

CROSS REFERENCE TO RELATED APPLICATIONS

This application is a continuation of PCT International Application No. PCT/EP2017/069490, filed Aug. 2, 2017, which claims priority under 35 U.S.C. § 119 from German Patent Application No. 10 2016 215 851.1, filed Aug. 23, 2016, the entire disclosures of which are herein expressly incorporated by reference.

BACKGROUND AND SUMMARY OF THE INVENTION

The invention relates to a cooling device for a battery assembly, in particular a high-voltage store, of an electrically driven vehicle, having multiple cooling lines in which a cooling medium is conducted. The cooling device is designed to transfer heat from the battery assembly to the cooling medium. The invention also relates to a unit including a battery assembly and such a cooling device.

In order to ensure the range, service life and retrievable power of electrically driven vehicles (such as, for example, hybrid vehicles, plug-in hybrid vehicles and purely electrically driven vehicles), defined thermal management of the batteries or battery cells or battery modules is necessary. In particular, it must be ensured here that the batteries formed as accumulators are in a defined temperature range at every time during the charging and discharging operation, since otherwise intensified degradation of the cell properties occurs, which promotes premature ageing of the accumulators, as a result of which their service life decreases.

For this reason, it is necessary to install in the interior of the battery assembly, which is in particular a high-voltage store, a cooling device formed as a refrigerant or cooling agent system, in order to restrict the maximum temperature of the battery assembly. In addition, it is critical that a temperature spread between the individual cells or cell modules of the battery assembly is kept as low as possible.

Current installation regulations, in particular in hybrid vehicles, to some extent require a multi-level arrangement of the battery cells or battery modules. Furthermore, the installation spaces in hybrid vehicles are often located in the vicinity of the exhaust gas system. This causes an at least partly asymmetrical input of heat into the battery assembly, and thus asymmetrical heating of individual regions of the battery assembly, in which cells or cell modules are accommodated. Since temperature spreads of this type within the battery assembly are often time-limited, the cooling device for the battery assembly cannot be designed permanently for the asymmetry. In addition, on account of the multi-level structure and the size of the battery assembly, there is a high number of parallel paths, to which the cooling medium would have to be allocated homogenously, which is physically difficult. This is true in particular in the case of a refrigerant which has only a very low proportion of a liquid phase. Given such a purely serial arrangement of the cooling lines, their overall length is naturally limited, which means that this is likewise not suitable for the cooling of a large battery assembly. In addition, control of the cooling medium distribution, for example via active distributor actuators, is omitted for reasons of cost.

It is therefore one of the objects of the invention to provide a cooling device which, with simple and cost-effective manufacture, permits a homogenous temperature distribution within a battery assembly, and thus ensures secure and reliable cooling of the battery assembly.

According to a first aspect of the invention, to this end, in a cooling device of the type mentioned at the beginning, provision is made for the cooling device to have at least two separately formed individual cooling elements located opposite a battery, which are each supplied with cooling medium via a dedicated valve assigned to the respective individual cooling element. As a result of using multiple individual cooling elements each having a dedicated valve, overall more parallel paths can be implemented within the cooling device, which permits a homogenous cooling medium allocation and thus a more homogenous temperature distribution within the battery assembly. In addition, the configuration according to the invention can be implemented comparatively simply and cost-effectively. In this connection, a battery is understood in particular as a battery module or a group of battery modules.

According to a preferred embodiment, between the cooling lines of an individual cooling element, there is no flow connection to the cooling lines of the other individual cooling element. Therefore, no exchange of cooling medium is possible between the individual cooling elements, which means that each individual cooling element so to speak represents a dedicated cooling device which is independent of the further individual cooling elements.

The cooling medium flow is preferably controllable by the individual cooling elements independently of each other. As a result, in particular temperature differences as a result of external influences, for example as a result of the input of heat from the exhaust gas system of a hybrid vehicle, can reliably be balanced out.

The individual cooling elements can each have one or more cooling plates. In the case of multiple cooling plates belonging to an individual cooling element, these are connected to one another fluidically, so that the cooling medium flow through all the cooling plates is controlled by the valve assigned to the individual cooling element.

According to a preferred refinement, the cooling medium is a refrigerant which, in particular, is present as a two-phase mixture having a liquid and gaseous phase. Direct refrigerant cooling is therefore present, in which the refrigerant itself flows through the individual cooling elements.

Alternatively, it is also contemplated to use water, for example, as cooling medium, which discharges the heat picked up to a refrigerant by way of a heat exchanger. Pure coolant cooling is also theoretically possible.

The valves are preferably self-regulating or controlled expansion valves. One example of a self-regulating expansion valve is a so-called thermostatic expansion valve (TXV); controlled expansion valves that are suitable are, for example, electro-thermostatic expansion valves (eTXV), electronic expansion valves (EXV), solenoid throttling valves (DMV) or valves operated by way of a shape memory alloy (SXV Shape Memory Valve).

The object set at the beginning is likewise achieved by a unit including a battery assembly and a cooling device according to an embodiment of the invention, wherein the battery assembly has multiple battery modules, which each comprise multiple battery cells. As a result of the use of multiple (i.e., at least two) individual cooling elements, temperature differences in the battery assembly as a result of external influences can be balanced out better, in particular when the individual cooling elements are controllable independently of one another. In addition, more parallel paths can be implemented, which permits a more homogenous cooling medium allocation and therefore a homogenous temperature distribution within the battery assembly.

According to a first preferred refinement, each individual cooling element is assigned to a battery module. In particular, each individual cooling element is assigned to exactly one battery module. As a result, particularly reliable and individually controllable cooling is achieved.

Alternatively, in particular in a high-powered battery assembly having many battery modules, it is possible that an individual cooling element is assigned to multiple battery modules, in particular up to 6 battery modules. As has been shown in trials, adequate cooling, for example of a high-voltage store, is ensured as a result, wherein the cooling device can be produced comparatively cost-effectively.

In a development, the individual cooling elements each have multiple cooling plates, wherein each cooling plate is assigned to a battery module and is arranged opposite the latter. In particular, each cooling plate is assigned to exactly one battery module, by which means particularly reliable and uniform cooling of the battery assembly is achieved. Here, the cooling plates rest in particular on an outer housing of the battery modules.

In a preferred embodiment, which is distinguished by a particularly space-saving structure, the battery modules are arranged at least partly vertically above one another in relation to the installation position in the vehicle. In particular, the battery assembly is a multi-level high-voltage store. In this refinement, the individual cooling elements or their individual cooling plates are also preferably arranged vertically above one another, specifically each in flat contact with the associated battery module.

A particularly compact structure can be achieved if a common housing is provided, in which the battery modules of the battery assembly and also the cooling device are arranged.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
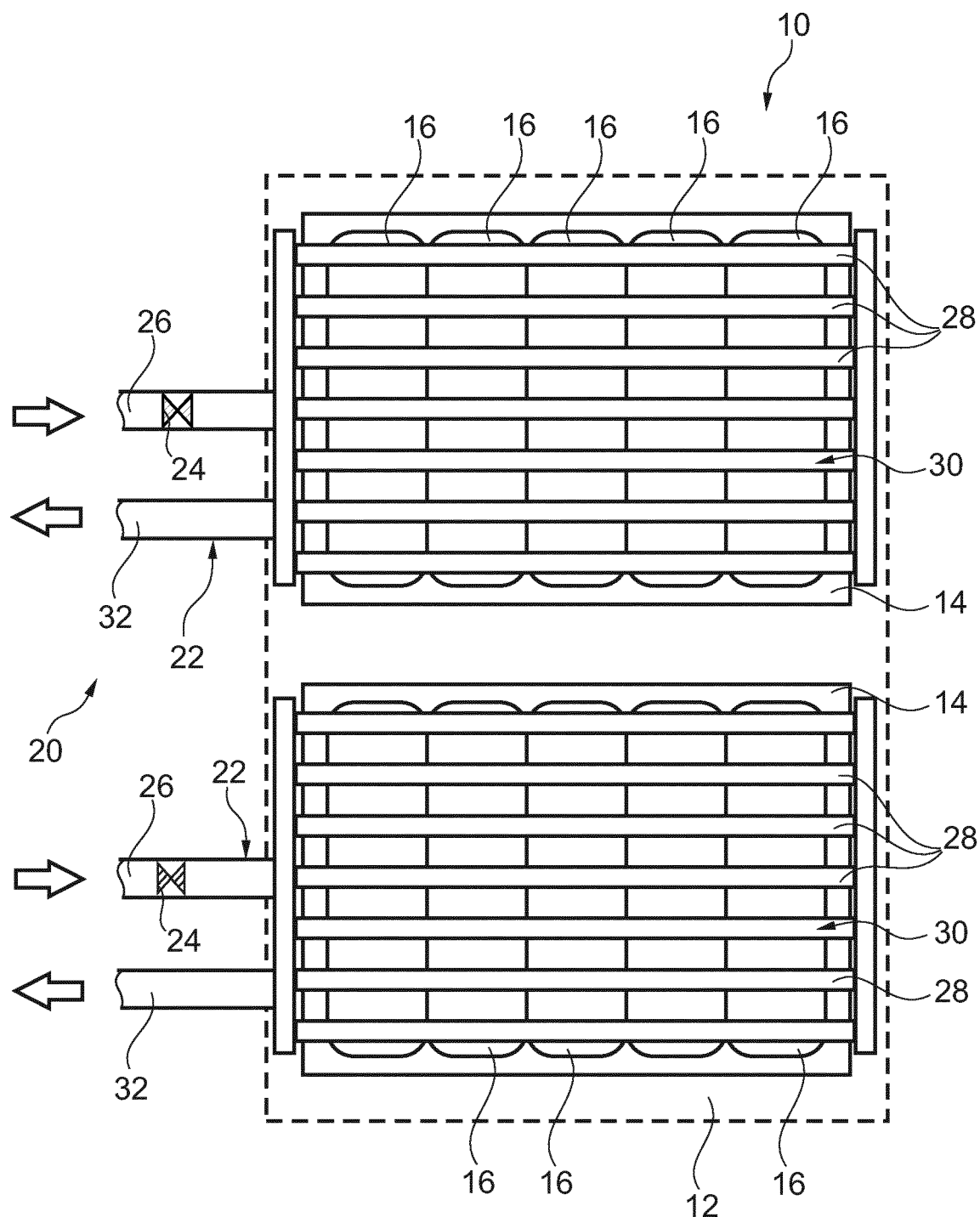
FIG. 1 is a schematic illustration of a unit including a battery assembly and a cooling device according to a first embodiment of the invention.

FIG. 1 shows a unit 10 according to a first embodiment of the invention. The unit 10 has a battery assembly 12 which, in particular, is a high-voltage store of an electrically driven vehicle, and includes multiple (here two) battery modules 14 which, in turn, are each assembled from multiple battery cells 16.

The unit 10 also has a cooling device 20, which includes multiple (here likewise two) separately formed individual cooling elements 22, which are each supplied with a cooling medium, here a refrigerant, via a dedicated valve 24 assigned to the respective individual cooling element 22. For this purpose, each individual cooling element 22 has a cooling medium inlet 26, in which there is arranged the valve 24, which is an expansion valve. The expansion valve can be designed to be self-regulating or controlled. The refrigerant used as cooling medium is present on the cooling medium inlet 26 as a supercooled liquid and, following expansion and after the expansion valve 24, is in particular present as a two-phase mixture of a liquid phase and a gaseous phase.

Via the respective cooling medium inlet 26 and the valve 24, the cooling medium in the form of the refrigerant can be supplied to multiple cooling lines 28 which, together, form a cooling plate 30, which is opposite a battery module 14 and rests flat on the latter. After the cooling medium has picked up heat from its associated battery module 14 via the parallel-arranged cooling lines 28 and has cooled said battery module 14 as a result, it can be discharged again to a cooling medium circuit of the vehicle via a cooling medium outlet 32.

As emerges from FIG. 1, each individual cooling element 22 is assigned to exactly one battery module 14, wherein, between the cooling lines 28 of an individual cooling element 22, there is no flow connection to the cooling lines 28 of the other cooling element 22. Therefore, no exchange of the cooling medium between the two individual cooling elements 22 is possible. Furthermore, the cooling medium flow through the individual cooling elements 22 can be controlled with the aid of the valves 24 independently of each other.

Figure 2:
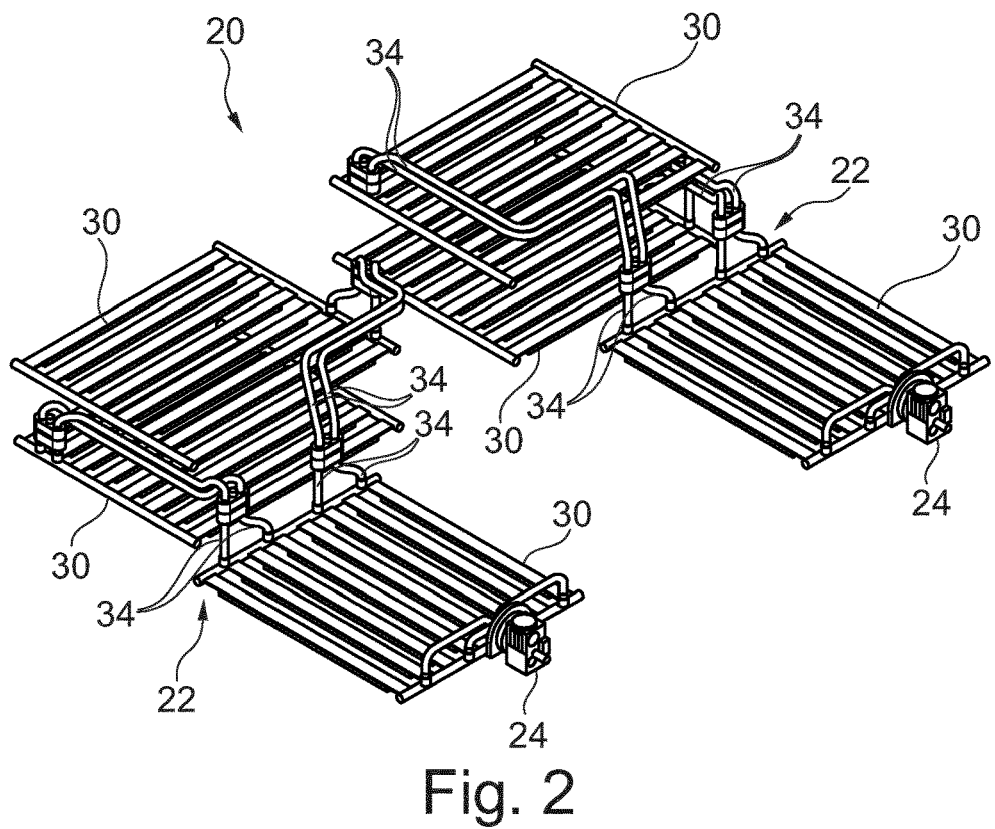
FIG. 2 is a perspective view of a cooling device according to a second embodiment of the invention.

FIG. 2 shows a cooling device 20 according to a second embodiment of the invention, identical elements bearing identical designations and, in the following text, only the differences from the embodiment described previously are discussed.

The cooling device 20 according to FIG. 2 likewise has two individual cooling elements 22, which are supplied with cooling medium in the form of refrigerant via a respectively assigned valve 24, also again a controlled or self-regulating expansion valve here. As opposed to the configuration according to FIG. 1, however, each individual cooling element 22 here has multiple cooling plates 30, specifically three cooling plates 30, which are connected fluidically to one another via connecting lines 34. However, the two individual cooling elements 22 are not connected fluidically to each other, so that no exchange of the cooling medium or refrigerant takes place between them.

In the configuration according to FIG. 2, each of the cooling plates 30 is assigned to a battery module of a battery assembly formed as a high-voltage store, and is arranged opposite said battery module. Each individual cooling element 22 thus cools three battery modules, the illustration of which has been omitted in FIG. 2 for reasons of clarity. Just like two each of the three cooling plates 30 of each individual cooling element 22 in FIG. 2, in the associated battery assembly the battery modules are arranged to some extent vertically one above another in relation to the installation position in the vehicle, the cooling plates 30 each being in flat contact with their associated battery module.

Figure 3:
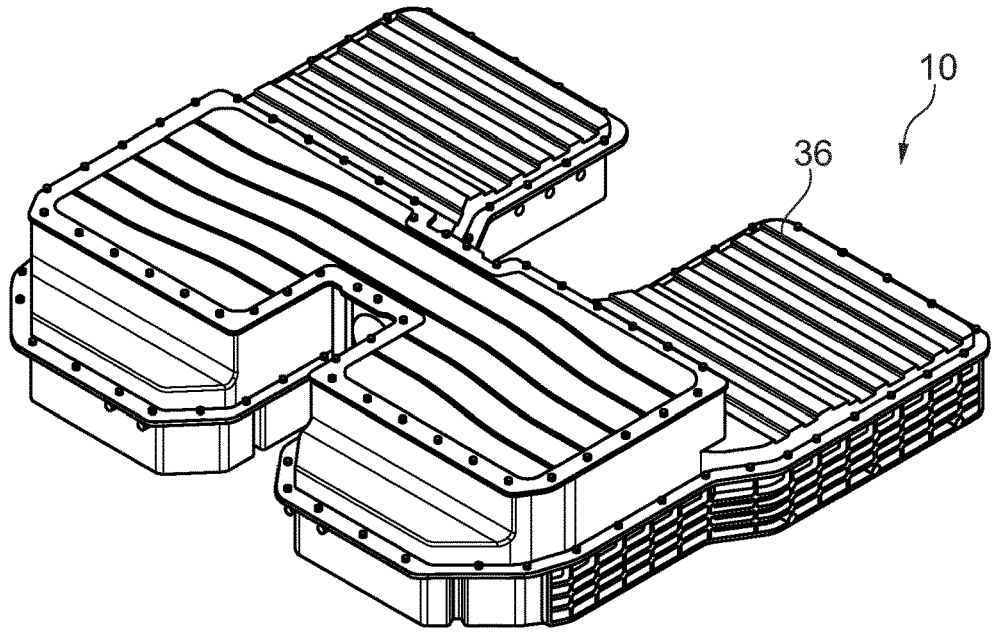
FIG. 3 is a perspective view of a unit according to the invention, in which the cooling device from FIG. 2 is used.

FIG. 3 shows a unit 10 according to the invention, in which the cooling device 20 according to FIG. 2 has been installed. The associated battery assembly is a multi-level high-voltage store, in which two battery modules are respectively arranged above one another in both halves of the unit 10. A common housing 36 is provided, in which both the battery modules of the battery assembly and the cooling device 20 having the individual cooling elements 22 each including three cooling plates 30 are arranged.

With the configuration according to the invention, temperature differences as a result of external influences can be balanced out better, since the individual cooling elements are controlled independently of one another by the associated valves. Furthermore, it is possible overall to implement more parallel paths, which permit a more homogenous refrigerant allocation and thus a homogeneous temperature distribution within the battery assembly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cooling device for a battery assembly, comprising:
   multiple cooling lines in which a cooling medium is conducted, the cooling device being configured to transfer heat from the battery assembly to the cooling medium, wherein:
   the cooling device includes at least two separately formed individual cooling elements located opposite a battery,
   each of the individual cooling elements is physically separated from and thermally independent of the other individual cooling elements, and
   each of the individual cooling elements is supplied with the cooling medium via a dedicated valve assigned to the respective individual cooling element.

2. The cooling device according to claim 1, wherein, between the cooling lines of the individual cooling elements, there is no flow connection to the cooling lines of the other individual cooling element.

3. The cooling device according to claim 1, wherein a flow of the cooling medium is controllable by the individual cooling elements independently of each other.

4. The cooling device according to claim 2, wherein a flow of the cooling medium is controllable by the individual cooling elements independently of each other.

5. The cooling device according to claim 1, wherein the individual cooling elements each have one or more cooling plates.

6. The cooling device according to claim 4, wherein the individual cooling elements each have one or more cooling plates.

7. The cooling device according to claim 1, wherein the cooling medium is a refrigerant.

8. The cooling device according to claim 7, wherein the cooling medium is present as a two-phase mixture having a liquid and gaseous phase.

9. The cooling device according to claim 4, wherein the cooling medium is a refrigerant which is present as a two-phase mixture having a liquid and gaseous phase.

10. The cooling device according to claim 1, wherein the valve is a self-regulating or controlled expansion valve.

11. The cooling device according to claim 1, wherein the battery assembly is for high-voltage storage of an electrically driven vehicle.

12. A unit comprising:
    a battery assembly; and
    a cooling device according to claim 1,
    wherein the battery assembly has multiple battery modules, which each comprise multiple battery cells.

13. The unit according to claim 12, wherein each individual cooling element of the cooling device is assigned to a battery module.

14. The unit according to claim 12, wherein an individual cooling element of the cooling device is assigned to multiple battery modules.

15. The unit according to claim 14, wherein the multiple battery modules are up to six battery modules.

16. The unit according to claim 14, wherein the individual cooling element has multiple cooling plates, and each cooling plate is assigned to a battery module and is arranged opposite the latter.

17. The unit according to claim 12, wherein the battery modules are at least partly arranged vertically above one another in relation to an installation position in a vehicle.

18. The unit according to claim 15, wherein the battery modules are at least partly arranged vertically above one another in relation to an installation position in a vehicle.

19. The unit according to claim 12, wherein a common housing is provided, in which the battery modules of the battery assembly and the cooling device are arranged.

20. The unit according to claim 18, wherein a common housing is provided, in which the battery modules of the battery assembly and the cooling device are arranged.

* * * * *